(12) United States Patent
Miura et al.

(10) Patent No.: US 6,333,818 B1
(45) Date of Patent: Dec. 25, 2001

(54) OPTICAL PICKUP DEVICE

(75) Inventors: Akira Miura; Taichi Akiba, both of Saitama-ken (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 09/621,583

(22) Filed: Jul. 21, 2000

(30) Foreign Application Priority Data

Jul. 23, 1999 (JP) .................................................. 11-209745

(51) Int. Cl.[7] ........................... G02B 27/10; G02B 27/12; G02B 27/14; H01J 3/14; G11B 7/00

(52) U.S. Cl. .......................... 359/618; 359/618; 359/639; 359/637; 250/216; 369/44.12; 369/112.01

(58) Field of Search ...................................... 359/618, 626, 359/636, 639; 250/216, 225; 369/44.12, 112.01

(56) References Cited

U.S. PATENT DOCUMENTS 5,617,389 * 4/1997 Satoh ............................... 359/44.42

* cited by examiner

Primary Examiner—Georgia Epps
Assistant Examiner—Michael A. Lucas
(74) Attorney, Agent, or Firm—Arent Fox Kintner Plotkin & Kahn PLLC

(57) ABSTRACT

An optical pickup device is provided with a focus error signal generating means which is adapted to calculate a first output sum signal obtained by adding together an output signal fed front one portion of the second light receiving means and an output signal fed from one portion of the third light receiving means, and to calculate a second output sum signal obtained by adding together an output signal fed from the other portion of the second light receiving leans and an output signal fed from the other portion of the third light receiving means, so as to calculate a difference between the first output sum signal and the second output sum signal, thereby producing a focus error signal.

5 Claims, 7 Drawing Sheets

FIG. 3 A    FIG. 3 B    FIG. 3 C
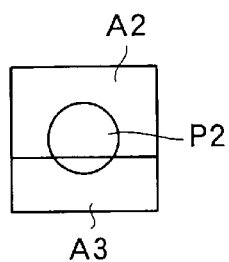
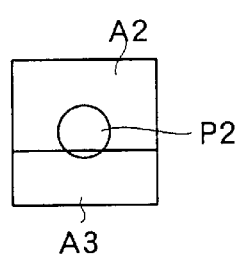
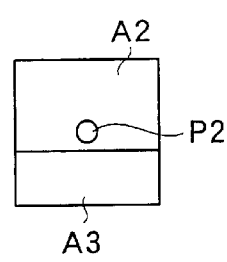
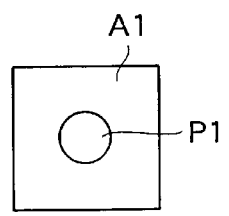
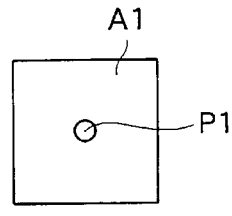
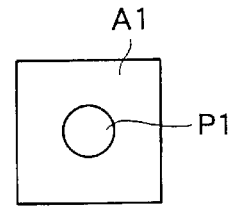
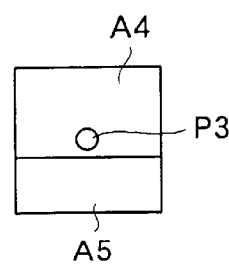
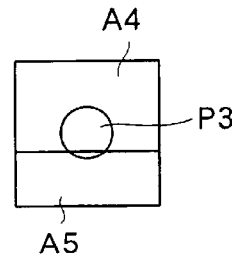
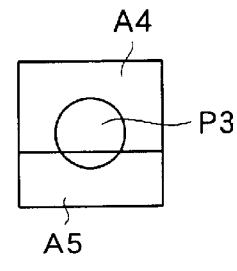
(FRONT PIN STATE)   (FOCUSED STATE)   (REAR PIN STATE)

FIG. 5 A
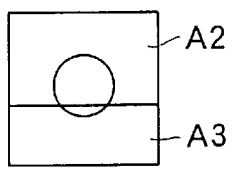
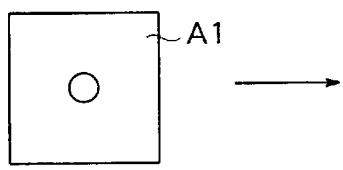
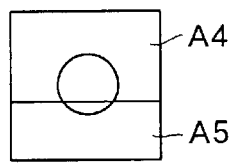
FIG. 5 B
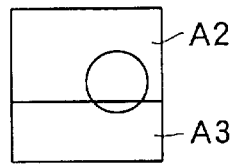
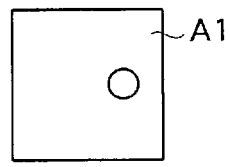
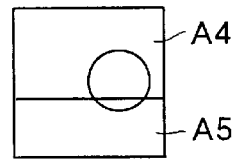
FIG. 5 C
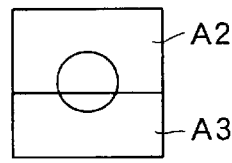
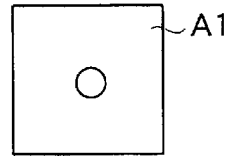
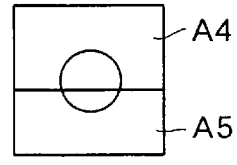
FIG. 5 D
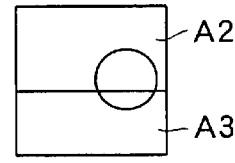
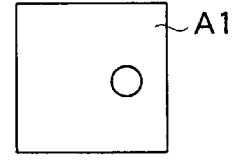
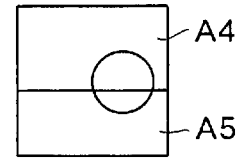

OPTICAL PICKUP DEVICE

BACKGROUND OF THE INVENTION

The present invention relates to an optical pickup device which is used to record information on or reproduce information from an information recording medium such as DVD (Digital Video Disc or Digital Versatile Disc) and CD (Compact Disc).

When an optical pickup is used to record information on or reproduce information from an information recording medium such as a DVD or a CD, a light beam is emitted from a light source and is then converged by an object lens so as to be formed in to a recording beam for recording information on a disc or a reading beam for reading information from a disc. In fact, such a recording beam or a reading beam is required to be focused on a recording surface of a disc when being incident thereon.

In order to detect whether or not a desired focused state has been reached and to detect whether or not there is a deviation from the desired focused state, a focus servo control is performed in which a focus error signal is generated (if there is such a deviation) and is used to control the focusing operation so that the focal point of the objective lens may be constantly and optically set on the recording surface of a disc (hereinafter referred to as "focused state").

As typical methods for generating a focus error signal, there have been known an astigmatism method and a spot size method.

In the astigmatism method, a light reflected from an information recording medium, upon being separated from an original light beam (emitted from a light source and irradiating the recording medium) in a beam splitter, is passed through a cylindrical lens so as to produce an astigmatic difference. The pattern of a reflected light beam reflected from the recording surface is detected in accordance with a distance between the objective lens and the recording surface, thereby producing a focus error signal.

In detail, the reflected light bean is detected by a photodetector having a 4-divided light-receiving area, when the objective lens is in its correct focusing position, a true circular pattern of a reflected light will come to the central position of the light-receiving area.

If a distance between the objective lens and a disc is shorter than a predetermined focal distance, a reflected light having a horizontally arranged elliptical shape will come to the light-receiving area, and thus a difference between the output signals fed from different sections of the light-receiving area may be calculated, thereby producing a focus error signal (indicating a so-called "front pin state" in which the lens is too close to the disc).

On the other hand, if a distance between the objective lens and a disc is longer than a predetermined focal distance, a reflected light having a vertically arranged elliptical shape will come to the light-receiving area, and thus a difference between the output signals of different sections of the light-receiving area may be calculated, thereby producing another focus error signal (indicating a so-called "rear pin state" in which the lens is too far away from the disc).

In this way, the level of each focus error signal is detected one by one, and the position of the objective lens is adjusted constantly so that a true circular pattern of a reflected light beam will constantly come to the central position of the light-receiving area, thereby maintaining a correct focusing operation.

On the other hand, a spot size method may be carried out in a manner shown in FIGS. 1A and 7B. As shown in the drawings, a reflected light beam obtained by reflecting a recording beam or a reading beam on a recording surface of a disc can be detected by photodetectors PD1 and PD2 each having a plurality of symmetrically arranged areas for receiving a light beam, so that it is allowed to calculate a difference between the levels of output signals fed from different detecting areas, thereby producing a focus error signal FE.

In detail, the photodetector PD1 shown in FIG. 7A has two coaxially arranged light-receiving areas A1 and A2. A difference between the levels of the signals fed from the light-receiving areas A1 and A2 is calculated by a subtracter C1, thereby producing a focus error signal FE.

In fact, the focus error signal FE will change in its level so as to indicate a focused state or a deviated state (the lens is too close to or too far way from the disc), corresponding to sizes of reflected light patterns PT1, PT2, PT3. For example, if a reflected light having a pattern PT1 is incident on both the area A1 and the area A2, it is determined that the objective lens is just at its correct focusing position (a desired focused state has been obtained). If a reflected light having a pattern PT2 is incident on an area smaller than PT1 it is determined that the lens is too close to the disc ("front pin state"). On the other hand, if a reflected light having a pattern PT3 is incident on an area larger than PT1, it is determined that the lens is too far from the disc ("rear pin state"). In this way, the position of the objective lens may be continuously adjusted in accordance with a level change of a focus error signal, thereby constantly maintaining the objective lens at its correct focusing position so as to ensure a desired focused state.

Further, the photodetector PD2 shown in FIG. 7B has three light-receiving areas A1, A2 and A3 which are symmetrically arranged with respect to the optical axis of a reflected light beam. The levels of signals fed from the light-receiving areas A2 and A3 are added together in an adder C2 so as to obtain an added level. Then, a subtracter C3 is used to calculate a difference between the added level and the level of a signal fed from the light-receiving area A1, so as to produce a focus error signal FE. In this way, similar to an arrangement shown in FIG. 7A, the level of a focus error signal FE will change corresponding to the size of a reflected light spot incident on one or more of the light-receiving areas A1, A2 and A3, thereby indicating whether or not the object lens is in its correct focusing position. Therefore, the position of the objective lens may be adjusted in accordance with the level change of the focus error signal FE, so that the objective lens is allowed to be maintained at its correct focusing position, thereby constantly maintaining a desired focused state.

Actually, in an optical pickup device utilizing the astigmatism method, not only a focus error signal is generated in accordance with the detected signals fed from a 4-divided light-receiving area, but also a tracking error signal is generated as well (using a push-pull method).

Here, when an optical pickup device (employing the above described astigmatism method) is used to record information on or to read information from a high density recording medium such as DVD-RW (Rewritable DVD), a recording beam or a reading beam is required to trace the information grooves physically formed on the recording surface of a DVD-RW so as to perform a predetermined scanning. At this time, a beam spot pattern of a light reflected from a groove and from an adjacent land is detected by the four light-receiving sections. Then, a difference between the levels of detected signals fir on different sections is calculated so as to produce a tracking error signal containing a land positional information.

However, in order to detect such a tracking error signal with a high sensitivity, i.e., in order to obtain a tracking error signal having a high level, it is required that a recording light beam or a reading light beam be set so that the wavelength λ of a laser light beam can satisfy an equation $\Delta d = \lambda/8$, wherein $\Delta d$ represents a phase difference between a groove surface and a land surface (in other words, a land depth with respect to an adjacent groove).

However, in using a conventional optical pickup device employing an astigmatism method, when a tracking error signal is obtained with a high sensitivity, the tracking error signal will partially leak into a focus error signal, hence undesirably decreasing a detection precision in a process of detecting a focus error signal.

On the other hand, when using a spot size method shown in FIG. 7A and FIG. 7B, there will occur a problem shown in FIG. 8A and 8B. Namely, as shown in the drawings, when an incident position of a reflected light is deviated from its optical axis, a detection precision in a process of detecting a focus error signal will be greatly decreased. Since the detection precision for detecting a focus error signal greatly depends upon the precision of an optical system itself, it is required to employ a high precision optical system which is usually very expensive. Further, if a recording medium is a DVD-RW capable of recording information with a high density, a focus servo operation is required to be conducted at a further high precision, this however has been proved difficult in industrial production when manufacturing an optical pickup.

SUMMARY OF THE INVENTION

It is an object of the present invention to provide an improved optical pickup device which can perform a focus servo operation (with a high precision) on an information recording medium capable of recording infornation with a high density, so as to solve the above-mentioned problems peculiar to the above-discussed prior arts.

According to the present invention, there is provided an optical pickup device comprising: a light emitting means capable of emitting a recording light beans or a reading light beam on to an information recording medium, for recording information on or reading information from the recording medium; a light treating means capable of producing at least two guide beans on to the recording medium; a first light receiving means capable of receiving a reflected light generated when the recording light beam or the reading light bean is incident on the recording medium; a second light receiving means and a third light receiving means, each capable of receiving a reflected light generated due to a guide beam; a focus error signal generating means provided for performing calculation on various output signals fed from each of the second and third light receiving means so as to produce a focus error signal. In particular, a light beam is emitted from the light emitting means and is passed through the light treating means to form three optical paths extending to the first, second and third light receiving means, the second light receiving means is disposed at a position forming a longer optical path than an optical path associated with the first light receiving means, the third light receiving means is disposed at a position forming a shorter optical path than the optical path associated with the first light receiving means. The light-receiving area of each of the second and third light receiving means is non-symmetrically divided into two portions. The second light receiving means and the third light receiving means are arranged symmetrically with respect to the first light receiving means.

According to one aspect of the present invention, the focus error signal generating means is adapted to calculate a first output sum signal obtained by adding together an output signal fed from one portion of the second light receiving means and an output signal fed from one portion of the third light receiving means, and to calculate a second output sum signal obtained by adding together an output signal fed from the other portion of the second light receiving means and an output signal fed from the other portion of the third light receiving means, so as to calculate a difference between the first output sum signal and the second output sum signal thereby producing a focus error signal.

With the use of the above constitution, the reflected lights generated due to the guide beams will enter the tight receiving areas of various light receiving means, the size of each reflected light will change corresponding to a focused state or a non-focused state. In this manner, each reflected light will be received by each of two light receiving areas formed on each light receiving means. Since two light receiving areas are non-symmetrically formed on each light receiving means, each reflected light is non-symmetrically divided when being received by two light receiving areas.

The above objects and features of the present invention will become better understood from the following description with reference to the accompanying drawings.

BRIEF DESCRIPTION OF DRAWINGS

FIG. 3A is an explanatory view indicating an incidence state of a reflected light enterring a photodetector, showing a condition when an objective lens is too close to a recording medium.

FIG. 3B is an explanatory view indicating an incidence state of a reflected light enterring a photodetector, showing a condition when an objective lens is just at its correct position for focusing operation.

FIG. 3C is an explanatory view indicating an incidence state of a reflected light enterring a photodetector, showing a condition when an objective lens is too far front a recording medium.

FIGS. 5A to 5D are explanatory views indicating that the optical pickup device made according to the present invention is optically stronger than conventional ones.

DETAILED DESCRIPTION OF THE PREFERRED EMBODIMENTS

Several embodiments of the present invention will be described in the following with reference to the accompanying drawings.

Figure 1:
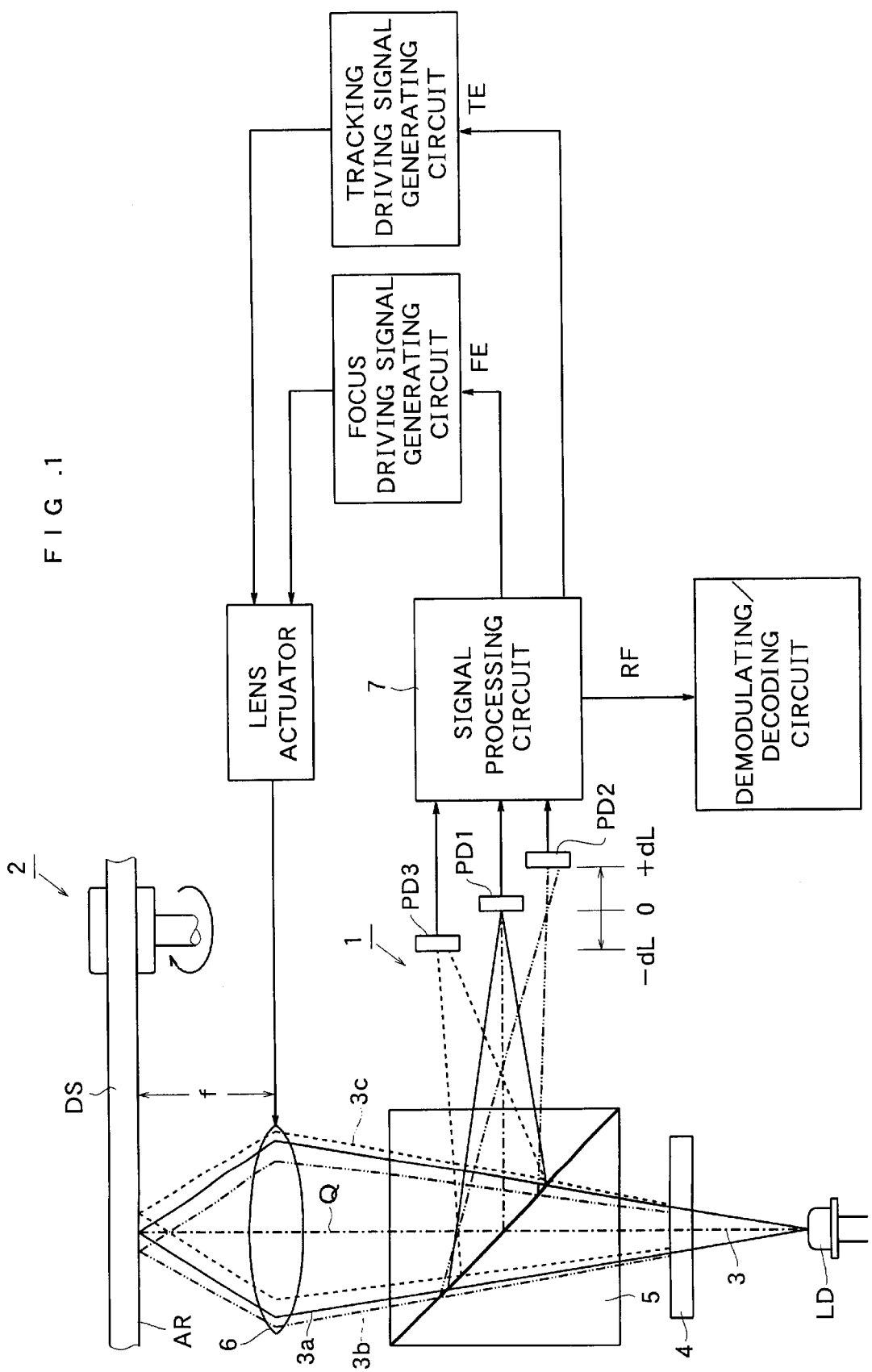
FIG. 1 is a block diagram indicating the constitution of an optical pickup device made according to an embodiment of the present invention.

FIG. 1 a block diagram indicating the constitution of an optical pickup device made according to one embodiment of the present invention.

Referring to FIG. 1 a clamp structure 2 is provided which can hold an optical disc DS in a predetermined position and can rotate the optical disc at a predetermined speed. The optical pickup device 1 is positioned under the optical disc DS in a manner such that the disc DS may face the information recording surface AR of the optical disc DS.

As shown in FIG. 1, the optical pickup device 1 comprises a laser light source LD capable of emitting a laser light 3 having a predetermined wavelength, a grating 4 for diffracting the laser light 3, a half-prism 5, an objective lens 6, photodetectors PD1 to PD3, a signal reproducing circuit 7.

The laser source LD, the grating 4 and the half-prism 5 are all arranged with their center axis being coincident with the optical axis of the optical system. The laser light 3 emitted from the laser source LD is caused to pass through the grating 4 and the half-prism 5, and is converged by the objective lens 6 so as to be used as a recording light beam or a reading light beam when irradiating the recording surface of an optical disc. Here, it is allowed that the half-prism 5 may be replaced by a half-mirror.

The photodetectors PD1, PD2 and PD3 are arranged in a manner such that, when the laser light 3 is reflected from the recording surface AR of the optical disc DS, the reflected light at first passes through the objective lens 6 and then the harf-prism 5, s as to be received by the photodetectors PD1, PD2 and PD3.

Further, there is also provided a lens actuator (FIG. 1) for effecting a fine adjustment to adjust a distance between the objective lens 6 and the recording surface AR of the optical disc DS. With the use of the actuator, a desired focus servo may be efffected by driving the actuator in accordance with a focus error signal FE.

Here, when the objective lens 6 is at a position which enables the laser light passing through the objective lens 6 to get focused (to have its focal point) on the recording surface AR, a zero order laser light 3a passing through the grating 4 is used as a recording beam or a reading beam so as to be incident on the recording surface AR with the lens's focal point on the recording surface. Then, a reflected light from the recording surface AR is passed through the objective lens 6 and reflected by the half-prism 5, so as to be received by the photodetector PD1. Namely, the photodetector PD1 is located at a position such that when a focused state has been reached (focal point of the lens is on the recording surface AR), the length of an optical path for the zero order light 3a to proceed from the laser light source LD to the recording surface AR is substantially equal to another optical path for a reflected light to proceed from the recording surface AR to the light-receiving area of the photodetector PD1.

In practice, the photodetector PD1 is not necessary to be strictly located at a position capable of receiving a reflected light in a true focused state, but is allowed to be located at a position capable of receiving a reflected light in a substantially true focused state. In other words, the photodetector PD1 is allowed to be located at a conjugated position with respect to the light emitting point of the laser light source LD or at a position in the vicinity of the laser light source.

On the other hand the photodetectors PD2, PD3 are located at positions for receiving two reflected lights in their defocused states. Here, the two reflected lights are generated due to a plus first order light 3b and a minus first order light 3c (both of which arc obtained by passing the laser light 3 through the grating).

In detail, the photodetector PD2 is provided in a manner such that when the zero order light 3a has reached a focused state on the recording surface AR of an optical disc, a reflected light generated due to a plus first order light 3b (represented by a dot ted chain line in FIG. 1) enterring the recording surface AR at a focused state will be incident on the light-receiving area of the photodetcctor PD2 at a "rear pin state".

Similarly, the photodetector PD3 is provided in a manner such that when the zero order light 3a has reached a focused state on the recording surface AR of an optical disc, a reflected light generated due to a minus first order light 3c (represented by a broken line in FIG. 1) enterring the recording surface AR at a focused state will be incident on the light-receiving area of the photodetector PD3 at a "front pin state".

Namely, as shown in FIG. 1, the position of the photodetector PD1 is assunmed as a reference position, the photodetector PD3 is located −dL closer to the deflection prism 5 than the photodetector PD1, while the photodetector PD2 is located +dL farther away from the deflection prism 5 than the photodetector PD1.

As a result, the length of an optical path of the plus first order light 3b is shorter than that of the zero order light 3a, while the length of an optical path of the minus first order light 3c is longer than that of the zero order light 3a.

Figure 2:
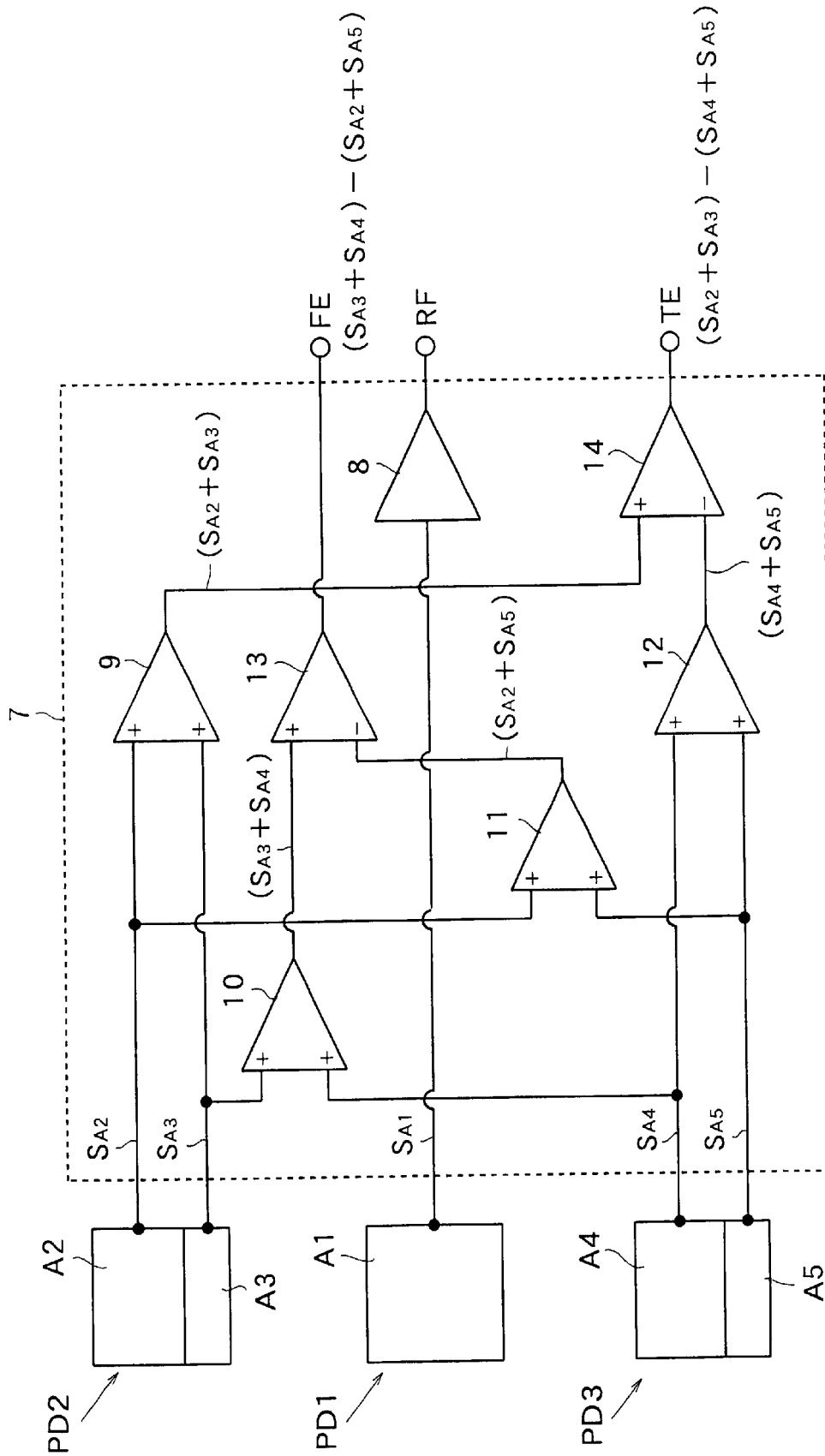
FIG. 2 is a circuit diagram indicating the light-receiving areas of several photodetectors and a signal processing circuit associated with these photodetectors.

FIG. 2 is a circuit diagram indicating the light-receiving areas of the photodetectors PD1, PD2, PD3 and a signal processing circuit 2 associated with these photodetectors.

As shown in FIG. 2, the photodetector PD1 has only one light-receiving area A1 for receiving a reflected light generated due to the zero order light 3a, the photodetector PD2 has two light-receiving areas A2 and A3 for receiving a reflected light generated due to the plus first order light 3b, the photodetector PD3 has two light-receiving areas A4 and A5 for receiving a reflected light generated due to the minus first order light 3c.

Here, the light-receiving areas A2, A3, A4 and A5 of the photodetectors PD2 and PD3 belong to substantially the sable type, but should be set so as to satisfy the following equations: A2+A3~A4+A5 and A2/A3~A4/A5.

As shown in FIG. 3B. When the objective lens 6 is at its correct focusing position so that its focal point is just located on the recording surface AR of an optical disc, a reflected light generated due to the zero order light 3a has a pattern P1 which is incident on the central position of the light-receiving area A1 of the photodetector PD1, a reflected light generated due to the plus first order light 3b has a pattern P2 which is incident on the central position of the photodetector PD2 (including light-receiving areas A2 and A3), a reflected light generated due to the minus first order light 3c has a pattern P3 which is incident on the central position of the photodetector PD3 (including light-receiving areas A4 and AS).

Namely, although the reflected light generated due to the plus first order light 3b is incident on both the light-receiving areas A2 and A3 of the photodetector PD2, most part of the reflected light is incident on the light-receiving area A2, only a small part of the reflected light is incident on the light-receiving area A3. Similarly, although the reflected light generated due to the minus firs order light 3c is incident on both the light-receiving areas A4 and A5 of the photodetector PD3, most part of the reflected light is incident on the light-receiving area A4, only a small part of the reflected light is incident on the light-receiving area A5.

Referring to FIG. 2, the signal processing circuit 7 comprises an amplifier 8, adders 9, 10, 11, 12 and subtracters 13, 14. The amplifier 8 is provided to amplify a detected signal SRF fed from the light-receiving area A1 so as to produce an RF signal. The adders 9, 10, 1, 12 and the subtracters 13, 14 are provided to perform various arithmetic operations on various detected signals fed from the light-receiving areas A2, A3, A4 and A5.

In detail, the adder 9 is provided to add together signals S A2 and S A3 fed from the light-receiving areas A2 and A3, the adder 10 is provided to add together signals S A3 and S A4 fed from the light-receiving areas A3 and A4, the adder 11 is provided to add together signals S A2 and S A5 fed from the light-receiving areas A2 and A5, the adder 12 is provided to add together signals S A4 and S A5 fed from the light-receiving areas A4 and A5. The substracter 13 is provided to calculate a difference between an output signal (S A3+S A4) fed from the adder 10 and an output signal (S A2+S A5) fed from the adder 11, so as to produce a difference signal [(S A3+S A4)−(S A2+S A5)] which can be used as a focus error signal.

The light-receiving areas A3 and A4 have a predetermined mutually corresponding relationship with each other. Similarly, the light-receiving areas A2 and A5 have a predetermined mutually corresponding relationship with each other.

The subtracter 14 is provided to calculate a difference between an output signal (S A2+S A3) fed front the adder 9 and an output signal (S A4+S A5) fed from the adder 12, so as to produce a difference signal [(S A2+S A3)−(S A4+S A5)] which can be used as a tracking error signal.

The above RF signal is fed to a denmodulating/decoding circuit (FIG. 1) to produce a video signal or an audio signal, while the focus error signal FE is fed to a focus driving signal generating circuit (FIG. 1), thereby adjusting the position of the focal point of the objective lens 6. Meanwhile, the tracking error signal TE is supplied to a tracking driving signal generating circuit (FIG. 1).

Next, an operation of the optical pickup device 1 having the above described constitution will be explained in the following with reference to FIGS. 3, 4, 5.

As described in the above, referring to FIG. 3B, when the objective lens 6 is at its correct focusing position so that its focal point is just located on the recording surface AR of an optical disc, a reflected light generated due to the zero order light 3$a$ has a pattern P1 which is incident on the central position of the light-receiving area A1 of the photodetector PD1, a reflected light generated due to the plus first order light 3$b$ has a pattern P2 which is incident on the central position of the photodetector PD2 (including light-receiving areas A2 and A3) a reflected light generated due to the minus first order light 3$c$ has a Pattern P3 which is incident on the central position of the photodetector PD3 (including light-receiving areas A4 and A5). At his time, since patterns P2 and P3 belong to a defocused state, they all have larger areas than the pattern P1.

On the other hand, if the objective lens 6 gets closer to the recording surface AR of an optical disc, a "front pin state" will happen in a manner shown in FIG. 3A. At this time, the pattern P1 and the pattern P2 have larger areas than those in a condition shown in FIG. 3B (when the objective lens 6 is at its correct focusing position) while the pattern P3 has a smaller area than that in a condition shown in FIG. 3B.

In contrast, if the objective lens 6 gets farther away from the recording surface AR of an optical disc, a "rear pin" state will happen in a manner shown in FIG. 3C. At this time the pattern P1 and the pattern P3 have larger areas than those in a condition shown in FIG. 3B (when the objective lens 6 is at its correct focusing position), while the pattern 2 has a smaller area than that in a condition shown in FIG. 3B.

In this way, the objective lens 6 will shift in its position with the passing of time. Thus, once the areas of the patterns P2 are P3 are caused to change, a received light amount P22 on the light-receiving area A2, a received light amount P23 on the light-receiving area A3, a received light amount P34 on the light-receiving area A4, a received light amount P35 on the light-receiving area A5, will also change in a manner shown in FIG. 4. Further, the detected signals S A2, S A3, S A4 and S A5 shown in FIG. 2 are proportional to the received light amounts P22, P23, P34, P35, so that the amplitude of the focus error signal FE (which is a difference (S A3+S A4)−(S A2+S A5)) will change in a manner shown in FIG. 4. However, referring to FIG. 4, at a time point $ic$ the objective lens 6 will at its correct focusing position with its focal point just on the recording surface AR of an optical disc.

In fact, the focus error signal FE indicates an amplitude change corresponding to a deviating amount of the objective lens 6 when the lens is in either a "front pin" state or a "rear pin" state, with the focused state (at the time point $ic$) serving as a reference point. Further, since the polarity of the amplitude of the focus error signal in the "front pin" state is just the opposite to that of the amplitude of the focus error signal in the "rear pin" state, it is allowed to easily detect whether or not the objective lens is in its correct focusing position (when the focal point of the objective lens is just on the recording surface AR of an optical disc), and to easily detect a deviated amount of the focal point of the objective lens.

Further, as shown in FIGS. 5A to 5D, even if there is a deviation in an incidence position when a reflected light is incident on to the light-receiving area of any one of the photodetectors PD1 to PD3, such kind of deviation will not bring about any significant influence on the amplitude change of the focus error signal FE. Therefore, it is at allowed to obtain a robust optical pickup device (having a high mechanical precision) having optical paths starting from the laser light source LD to the photodetectors PD1 to PD3. Moreover, even if an optical disc DS is slightly inclined with respect to the objective lens, it is still allowed to obtain a focus error signal FE with a high precision.

Namely, as compared with an ideal condition shown in FIG. 5A, even if there is a lateral deviation (shown in FIG. 5B) in the incidence position for a reflected light to be incident on to the light-receiving area of any one of the photodetectors PD1 to PD3, since the light-receiving areas A2 and A3 are different in their sizes and so are the light-receiving areas A4 and A5, and since a reflected light generated due to the plus first order light 3$b$ and a reflected light generated due to the minus first order light 3$c$ are all detected non-symmetrically, a difference (S A3+S A4)−(S A2+S A5) may be calculated so as to obtain a focus error signal FE only slightly affected by the lateral deviation.

On the other hand, if there is a longitudinal deviation (shown in FIG. 5C) in the incidence position for a reflected light to be incident on to the light-receiving area of any one of the photodetectors PD1 to PD3, and similarly, if there is a deviation in an inclined direction in the incidence position for a reflected light to be incident on to the light-receiving area of any one of the photodetectors PD1 to PD3, since the light-receiving areas A2 and A3 are different in their sizes and so are the light-receiving areas A4 and A5, and since a reflected light generated due to the plus first order light 3*b* and a reflected light generated due to the minus first order light 3*c* are all detected non-symmetrically, a difference (S A3+S A4)−(S A2+S A5) may be calculated so as to obtain a focus error signal FE only slightly affected by the longitudinal deviation or the deviation in an inclined direction.

As a comparison, in a conventional optical pickup device employing an astigmatism method, if a tracking error signal is to be obtained with a high sensitivity, it is required that the wave length λ of a recording light bean or a reading light beam be set by taking into account a phase difference between grooves and lands of a DVD-RW. This, however, will cause a problem that the tracking error signal will partially leak into a focus error signal, hence undesirably decreasing a detection precision in a process of detecting a focus error signal. This problem inherent in the above described prior art has been solved in the present invention. Namely, the present invention has made it possible to obtain a high precision focus error signal FE and at the same time to prevent a tracking error signal TE from leaking into the focus error signal FE, without having to take into account a relationship between the wavelength λ of the laser light 3 on one hand and the phase difference (between groove and land) on the other.

Hower, the optical pickup device made according to the present embodiment should not be limited for use only with a specific optical disc such as a DVD-RW or a CD. In fact, the optical pickup device of the present invention may be used with all kinds of recording media capable of recording information thereon and allowing the rereading of information therefrom.

Figure 6:
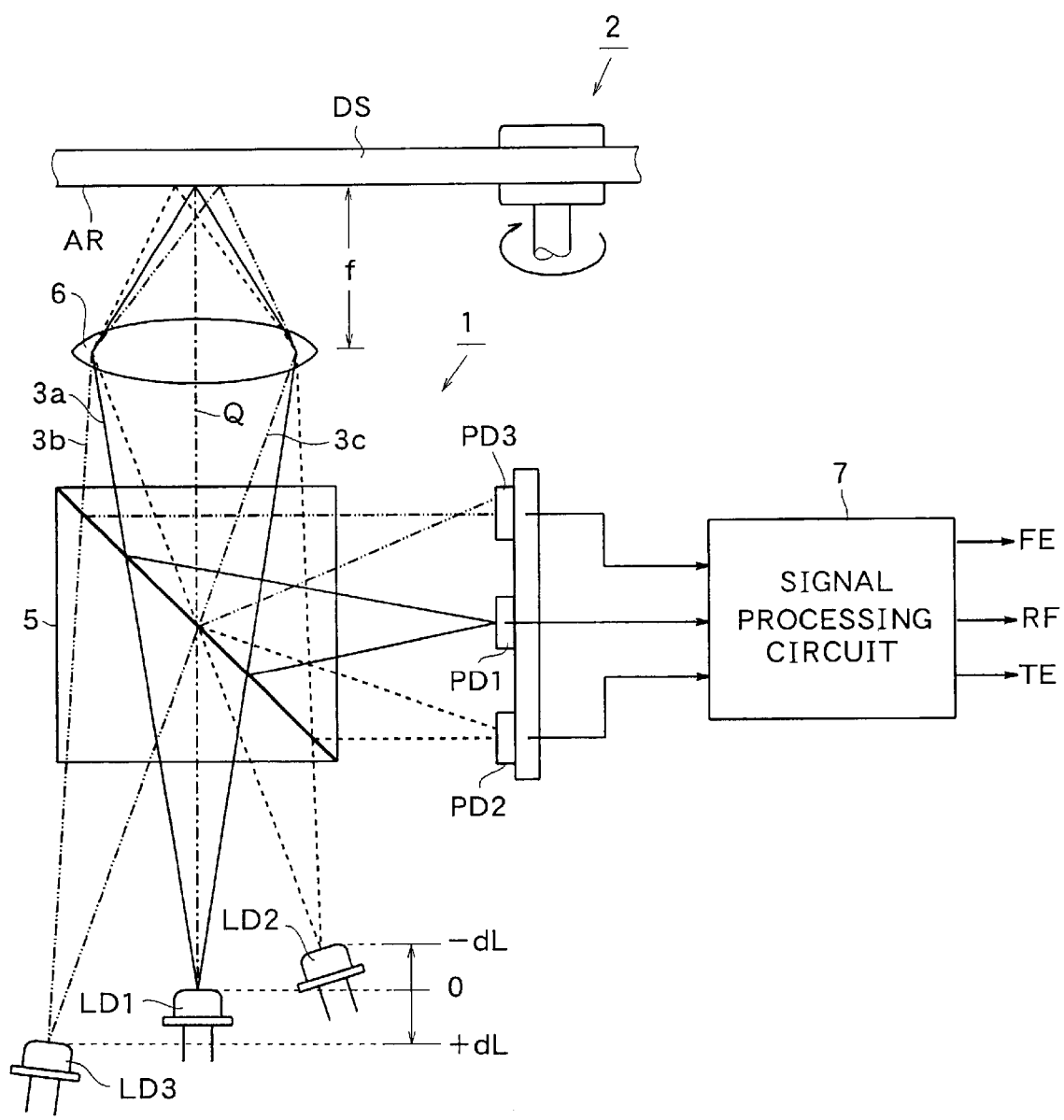
FIG. 6 is a block diagram indicating the constitution of an optical pickup device made according to another embodiment of the present invention.
Figure 7:
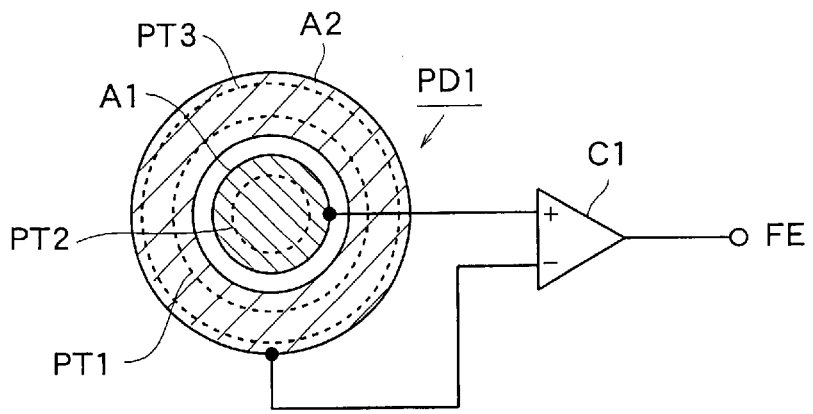
FIGS. 7A and 7B are explanatory views indicating problems existing in a conventional optical pickup device using a spot size method.
Figure 7:
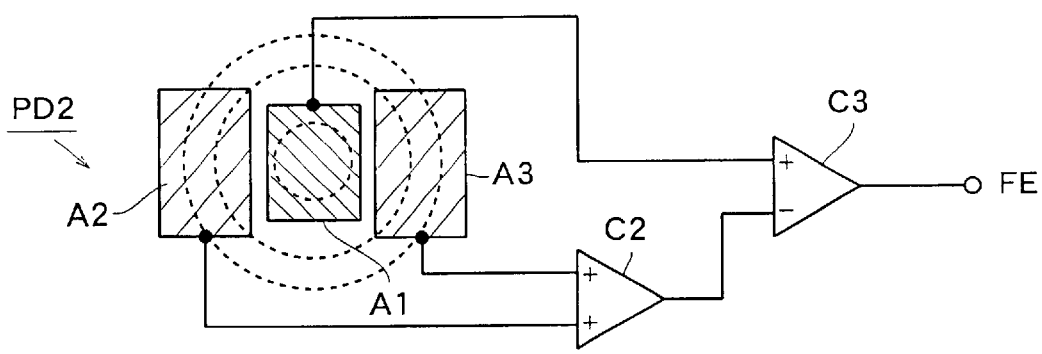
Figure 8:
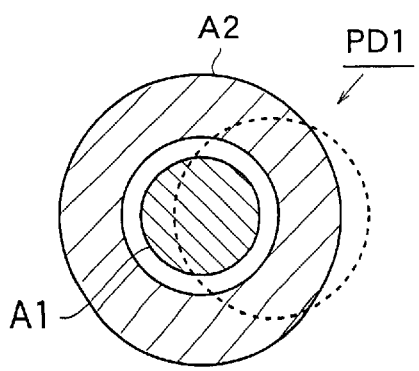
FIGS. 8A and 8B are explanatory views indicating further problems existing in a conventional optical pickup device using a spot size method.
Figure 8:
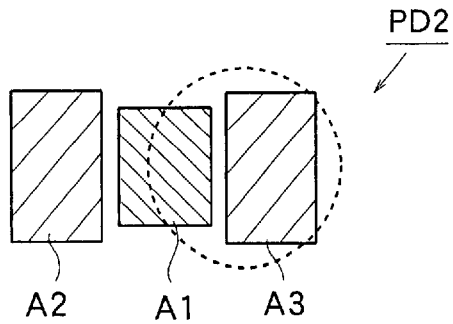

In addition, an optical pickup device according to the present invention may also be modified so as to obtain an arrangement shown in FIG. 6. However, in FIG. 6, the same elements as those shown in FIG. 1 are represented by the same reference numerals. As shown in FIG. 6, the modified optical pickup device is so formed that its photodetectors PD1 to PD3 are disposed on an identical semiconductor substrate plate, with all the optical paths (starting from the objective lens 6 to the photodetectors PD1, PD2, PD3) being equal to one another. Further, there are provided three laser light sources LD1, LD2, LD3, with the laser light source LD2 being the closest to the objective lens 6 and the laser light source LD3 the farthest from the objective lens 6. However, the light-receiving areas of the PD1 to PD3 are just the same as those shown in FIG. 2. Here, since there are provided three laser light sources LD1, LD2, LD3, a grating 4 shown in FIG. 1 is omitted.

Figure 4:
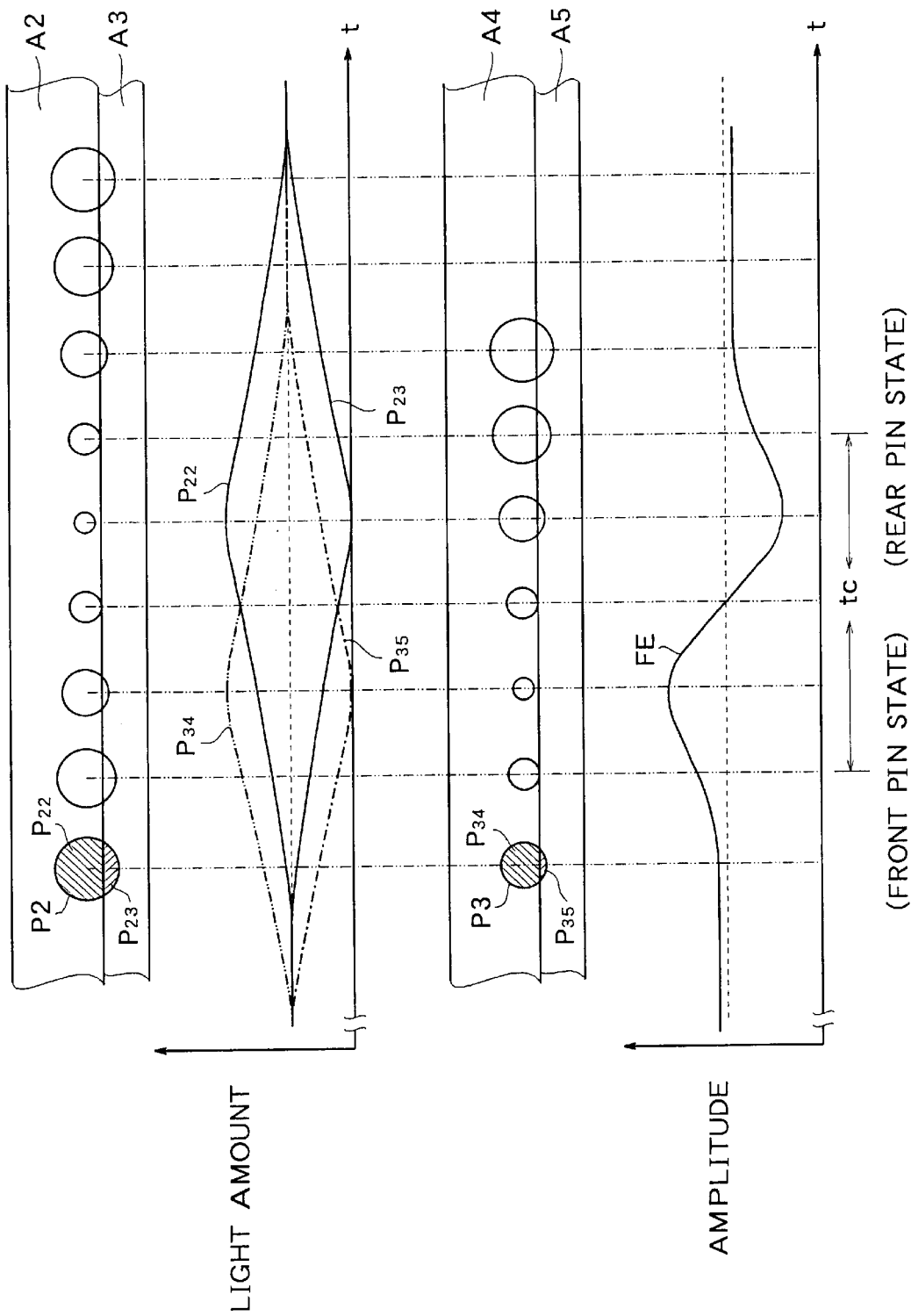
FIG. 4 shows two graphs associated with two explanatory views, indicating the waveforms of the signals detected in the light-receiving areas of the photodetectors, also indicating the waveforms of focus error signals.

In this wad, the modified optical pickup device shown in FIG. 6 may be considered an optical equivalent as shown in FIG. 1, thereby ensuring the same effects as shown in FIGS. 3 to 5.

As described in the above, an optical pickup device according to the present invention comprises a light emitting means capable of emnitting a recording light beam or a reading light beam on to an information recording medium; a light treating means capable of producing at least two guide beams on to the recording medium; a first light receiving means capable of receiving a reflected light generated when the recording light bean or the reading light beam is incident on the recording medium; a second light receiving means and a third light receiving means, each capable of receiving a reflected light generated due to a guide beam; a focus error signal generating means for performing calculation on various output signals fed from each light receiving means so as to produce a focus error signal. In particular, three optical paths are formed starting from the light emitting means to the first, second and third light receiving means, the second light receiving means is disposed at a posit ion forming a longer optical path than an optical path associated with the first light receiving means, the third light receiving means is disposed at a position forming a shorter optical path than the optical path associated with the first light receiving means. The light-receiving area of each of the second and third light receiving means is non-symmetrically divided into two portions. The focus error signal generating means is adapted to calculate a first output sum signal obtained by adding together an output signal fed from one portion of the second light receiving means and an output signal fed front one portion of the third light receiving means, and to calculate a second output sum signal obtained by adding together an output signal fed front the other portion of the second light receiving means and an output signal fed from the other portion of the third light receiving means, so as to calculate a difference between the first output sum signal and the second output sum signal, thereby producing a focus error signal. In this way, it has become possible to easily detect with a high precision whether or not the objective lens is in its correct focusing position, and also to detect a deviation amount of the focal point when it deviates from its correct focusing position.

Further, even if there is a deviation in an incidence position when a reflected light is incident on to the light-receiving area of any one of the photodetectors, such kind of deviation will not bring about any significant influence on the amplitude change of the focus error signal FE, thereby making it sure to obtain a robust optical pickup device (having a high mechanical precision).

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An optical pickup device comprising:

a light emitting means capable of emitting a recording light beam or a reading light beam on to an information recording medium, for recording information on or reading information from the recording medium;

a light treating means capable of producing at least two guide beams on to the recording medium;

a first light receiving means capable of receiving a reflected light generated when the recording light beam or the reading light beam is incident on the recording medium;

a second light receiving means and a third light receiving means each capable of receiving a reflected light generated due to a guide beam;

a focus error signal generating means provided for performing calculation on various output signals fed from each light receiving means so as to produce a focus error signal;

characterized in that:

a light beam is emitted from the light emitting means and is passed through the light treating means to form three optical paths extending to the first, second and third light receiving means, the second light receiving means is disposed at a position forming a longer optical path than an optical path associated with the first light receiving means, the third light receiving means is disposed at a position forming a shorter optical path than the optical path associated with the first light receiving means;

the light-receiving area of each of the second and third light receiving means is non-symmetrically divided into two portions;

the second light receiving means and the third light receiving means are arranged symmetrically with respect to the first light receiving means.

2. The optical pickup device according to claim 1, wherein the focus error signal generating means is adapted to calculate a first output sum signal obtained by adding together an output signal fed from one portion of the second light receiving means and an output signal fed from one portion of the third light receiving means, and to calculate a second output sum signal obtained by adding together an output signal fed from the other portion of the second light receiving means and an output signal fed from the other portion of the third light receiving means, so as to calculate a difference between the first output sum signal and the second output sum signal, thereby producing a focus error signal.

3. The optical pickup device according to claim 1, wherein when the second light receiving means is non-symmetrically divided into two portions A2, A3 and the third light receiving means is non-symmetrically divided into two portions A4, A5, the portions A2, A3, A4 and A5 satisfy the following equations: $A2+A3 \sim A4+A5$ and $A2/A3 \sim A4/A5$.

4. The optical pickup device according to claim 1, wherein the light treating means is a grating provided between the light emitting means and the recording medium.

5. The optical pickup device according to claim 1 or 4, wherein said guide beams are a plus first order light and a minus first order light, both of which are obtained by diffracting a light beam in the grating.

* * * * *